(12) United States Patent
Hanusiak et al.

(10) Patent No.: US 10,579,789 B2
(45) Date of Patent: Mar. 3, 2020

(54) PORTABLE APPLIANCE

(71) Applicant: INTERNATIONAL BUSINESS MACHINES CORPORATION, Armonk, NY (US)

(72) Inventors: Tomasz Hanusiak, Malopolska (PL); Konrad Komnata, Cracow (PL); Jaroslaw Osinski, Mrozy (PL); Grzegorz Szczepanik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 15/701,515

(22) Filed: Sep. 12, 2017

(65) Prior Publication Data

US 2019/0080077 A1   Mar. 14, 2019

(51) Int. Cl.
| | |
|---|---|
| *G06F 21/44* | (2013.01) |
| *G06F 13/42* | (2006.01) |
| *G06F 21/60* | (2013.01) |
| *G06F 21/79* | (2013.01) |
| *G06F 16/23* | (2019.01) |

(Continued)

(52) U.S. Cl.
CPC .......... *G06F 21/44* (2013.01); *G06F 13/4282* (2013.01); *G06F 16/23* (2019.01); *G06F 21/10* (2013.01); *G06F 21/121* (2013.01); *G06F 21/34* (2013.01); *G06F 21/602* (2013.01); *G06F 21/79* (2013.01); *G06F 2213/0024* (2013.01);
(Continued)

(58) Field of Classification Search
CPC .......... G06F 21/44; G06F 21/10; G06F 21/34; G06F 16/23; G06F 21/79; G06F 21/602; G06F 21/121; G06F 13/4282; G06F 2221/2129; G06F 2213/0042; G06F 2213/0024
See application file for complete search history.

(56) References Cited

U.S. PATENT DOCUMENTS

| | | |
|---|---|---|
| 8,856,918 B1 | 10/2014 | Efstathopoulos et al. |
| 2004/0095382 A1 | 5/2004 | Fisher et al. |

(Continued)

OTHER PUBLICATIONS

Wikipedia, "Java Card," https://en.wikipedia.org/wiki/Java_Card, Printed on Sep. 1, 2017, pp. 1-5.
(Continued)

*Primary Examiner* — Mohammed Waliullah
(74) *Attorney, Agent, or Firm* — Joseph T. Schiller

(57) ABSTRACT

A portable appliance may be provided. It may comprise a storage device operable for storing at least one application software program, a processor operable for executing the at least one application software program, a broadband communication interface plug, pluggable to a computing device, and a broadband communication interface socket adapted for receiving a second broadband communication interface plug of a second portable appliance of a same kind. The present invention also discloses a method for operating the portable appliance, wherein the method stores at least one application software program, executes the at least one application software program, generates user interface data, receives user interface response data, and receives a second broadband communication interface plug of a second portable appliance of a same kind in the broadband communication interface socket of the portable appliance.

20 Claims, 6 Drawing Sheets

(51) Int. Cl.
    *G06F 21/12* (2013.01)
    *G06F 21/10* (2013.01)
    *G06F 21/34* (2013.01)

(52) U.S. Cl.
    CPC ............... *G06F 2213/0042* (2013.01); *G06F 2221/2129* (2013.01)

(56) References Cited

U.S. PATENT DOCUMENTS

| | | |
|---|---|---|
| 2008/0005426 A1 | 1/2008 | Bacastow et al. |
| 2014/0351544 A1 | 11/2014 | Abzarian et al. |
| 2016/0196454 A1* | 7/2016 | Soffer .................. H01R 4/4809 726/16 |
| 2016/0373408 A1* | 12/2016 | Wentworth ......... H04L 63/0227 |
| 2018/0225230 A1* | 8/2018 | Litichever ............... G06F 21/56 |

OTHER PUBLICATIONS

Oracle, "Java Card Technology," http://www.oracle.com/technetwork/java/embedded/javacard/overview/index.html, Printed on Sep. 12, 2017, pp. 1-2.

\* cited by examiner

PORTABLE APPLIANCE

BACKGROUND

The invention relates generally to an appliance, and more specifically, to a portable appliance working together with a host via a user interface. The invention relates further to a method for operating a portable appliance, and a computer program product.

Increased mobility of users provoke an increased mobility of data. Users want to have access to their data and their applications from any place they work, or they want and need access to their private and personal data. One possible solution for these requirements is to store the data on a central server and make application functionality available using web interfaces. The scenario is often denoted as cloud computing. The user only needs access to a network (i.e. the Internet) and a fully equipped end-point device, like a PC, a tablet computer, a smart phone, and the like. However, the endpoint device needs the complete set of user interface devices, like a screen, a keyboard, a pointing device, voice input/output, and so on.

On the other side, the advance in storage technology has led to mobile storage, very often in the form of Universal Serial Bus (USB) sticks, with large amounts of non-volatile memory. Users may carry these USB sticks around, having permanent access to their data as long as a host computer is available for input/output purposes and also, potentially, for providing the required applications. However, in such a scenario, application licensing is bound to the host device. If an application may not be available on the host computer, the data on the USB stick may not be accessible. On the other side, a proper license management and access to encrypted data has been addressed by special USB key devices. In such a scenario, a decryption key, in some instances also encryption keys, is/are stored in a non-volatile way in the memory of a USB device. In some cases, these keys may be stored in an un-erasable way, for example in a Read Only Memory (ROM).

SUMMARY

According to one aspect of the present invention, a portable appliance may be provided. The portable appliance may comprise a storage device (in particular at least one) operable for storing at least one application software program and a processor (in particular at least one) operable for executing the at least one application software program. The portable appliance may also comprise a broadband communication interface plug, which may be pluggable to a computing device, and a broadband communication interface socket adapted for receiving the broadband communication interface plug of a second portable appliance of a same kind.

According to another aspect of the present invention, a method for operating a portable appliance may be provided. The portable appliance may comprise a storage, a processor, a broadband communication interface plug and a broadband communication interface socket. The method may comprise storing at least one application software program on the storage of the portable appliance, executing the application software program by the processor, and generating user interface data by the processor, wherein the user interface data is displayable on a user interface. Furthermore, the method may comprise receiving user interface response data, by the processor, via the broadband communication interface plug, and receiving the broadband communication interface plug of a second portable appliance of a same kind in the broadband communication interface socket of the portable appliance.

In case the broadband communication interface plug/socket combination is symmetrical, it may not matter which side the portable appliance may be plugged into a socket of a host computer. The same may apply for the stacking of the portable appliances.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

According to an embodiment, a computer program product for operating a portable appliance, the portable appliance comprising a storage, a processor, a broadband communication interface plug, and a broadband communication interface socket, the computer program product comprising a computer readable storage medium having program instructions embodied therewith, the program instructions being executable by one or more computing systems to cause the one or more computing systems to perform a method comprising storing at least one application software program on the storage of the portable appliance, executing the application software program by the processor, and generating user interface data, by the processor, wherein the user interface data is displayable on a user interface. The program instructions may further comprise instructions for receiving user interface response data, by the processor, via the broadband communication interface plug, and receiving the broadband communication interface plug of a second portable appliance of a same kind in the broadband communication interface socket of the portable appliance.

BRIEF DESCRIPTION OF THE SEVERAL VIEWS OF THE DRAWINGS

It should be noted that embodiments of the present invention are described with reference to different subject-matters. In particular, some embodiments are described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained, with reference to the examples of embodiments but to which the invention is not limited.

Figure 1:
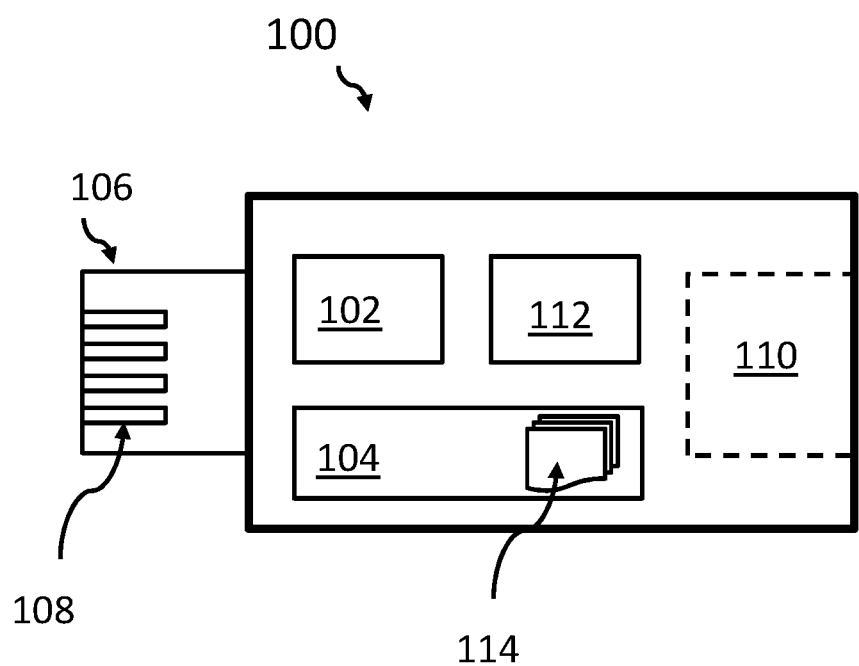

Preferred embodiments of the invention will be described, by way of example only, and with reference to the following drawings:

FIG. 1 depicts a block diagram of the inventive portable appliance, in accordance with an embodiment of the present invention.

Figure 2:
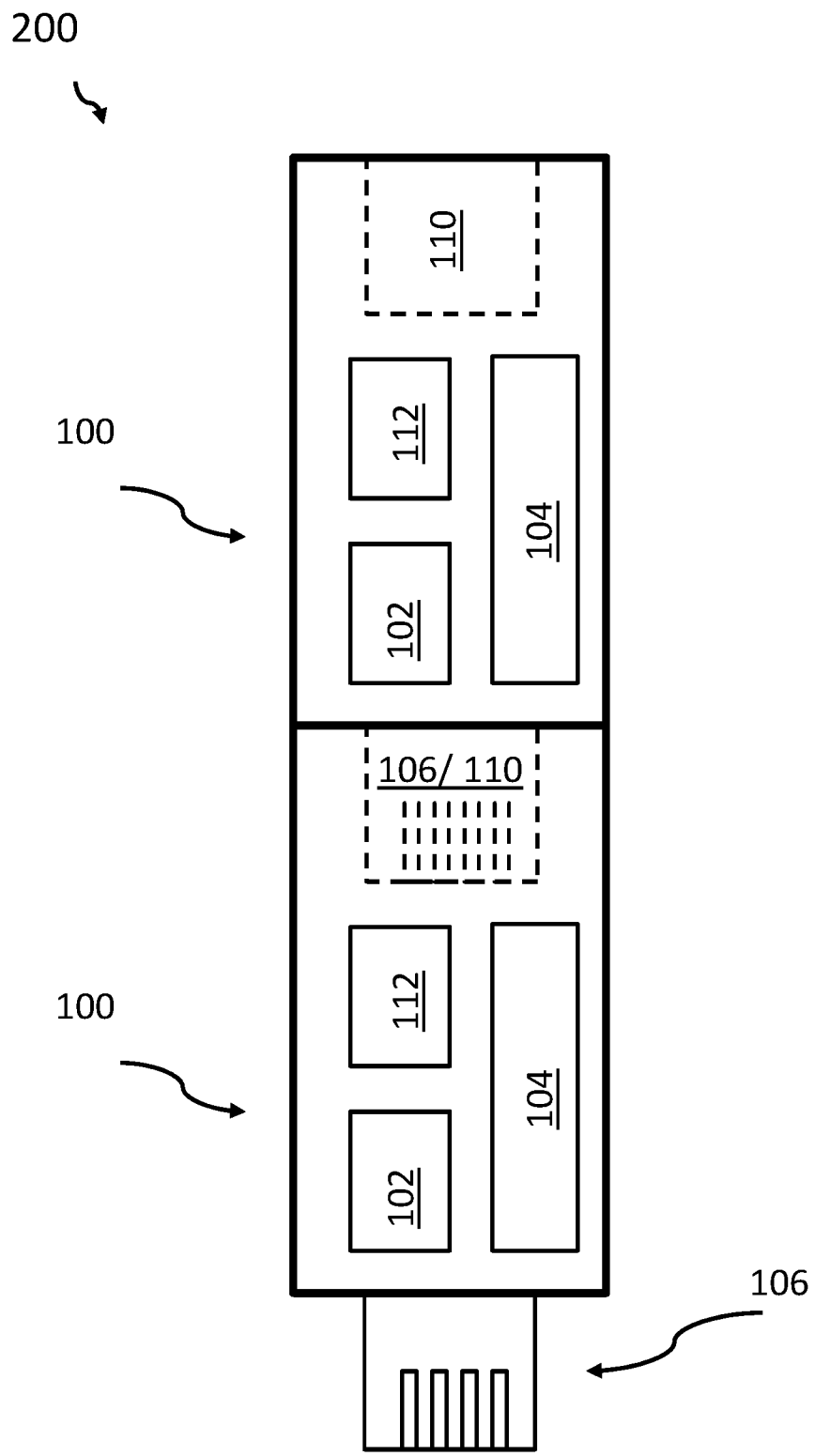

FIG. 2 depicts a block diagram of two stacked portable appliances, in accordance with an embodiment of the present invention.

Figure 3:
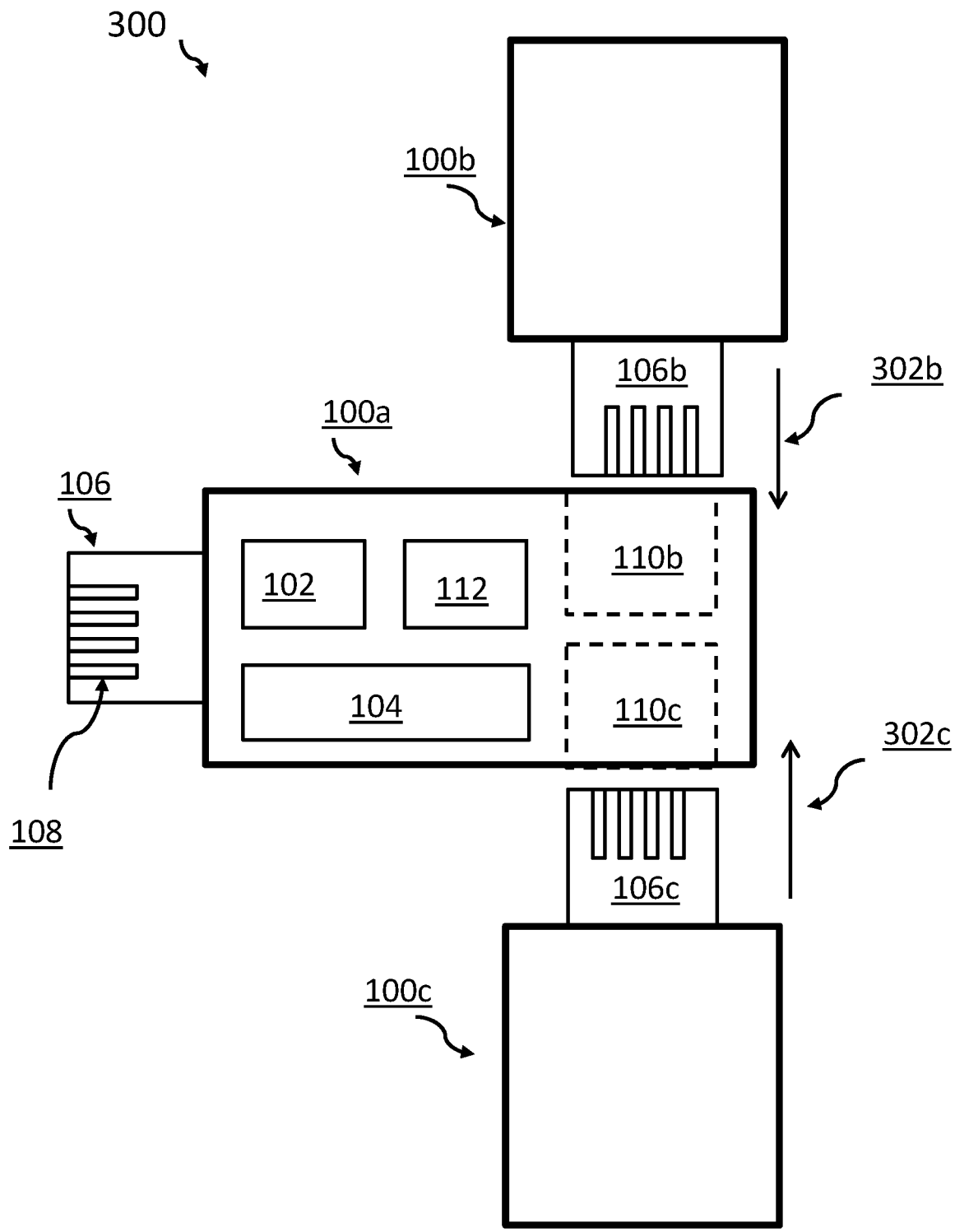

FIG. 3 depicts a block diagram of a portable appliance with two sockets, in accordance with an embodiment of the present invention.

Figure 4:
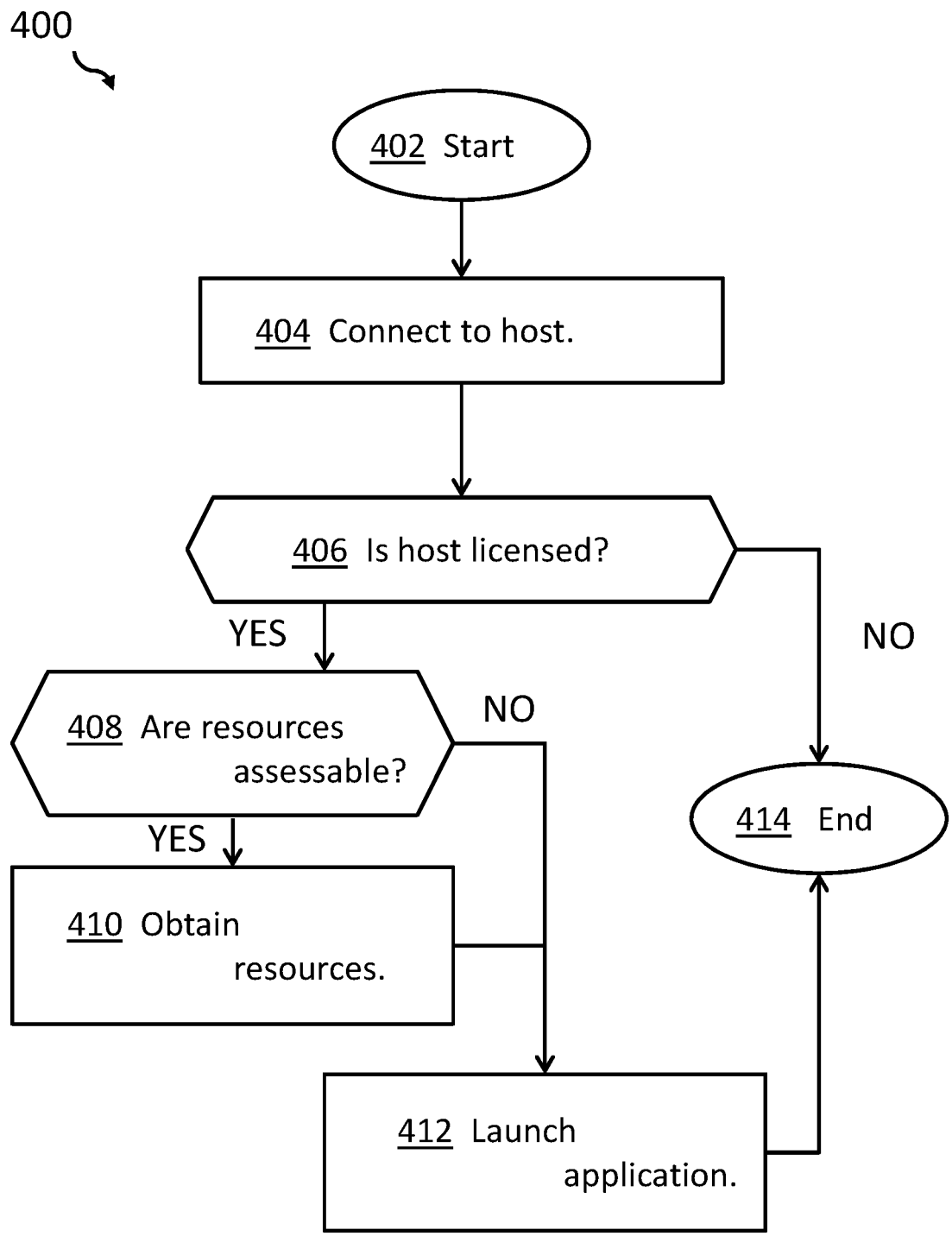

FIG. 4 depicts a flow chart of aspects of the method to operate the portable appliance, in accordance with an embodiment of the present invention.

Figure 5:
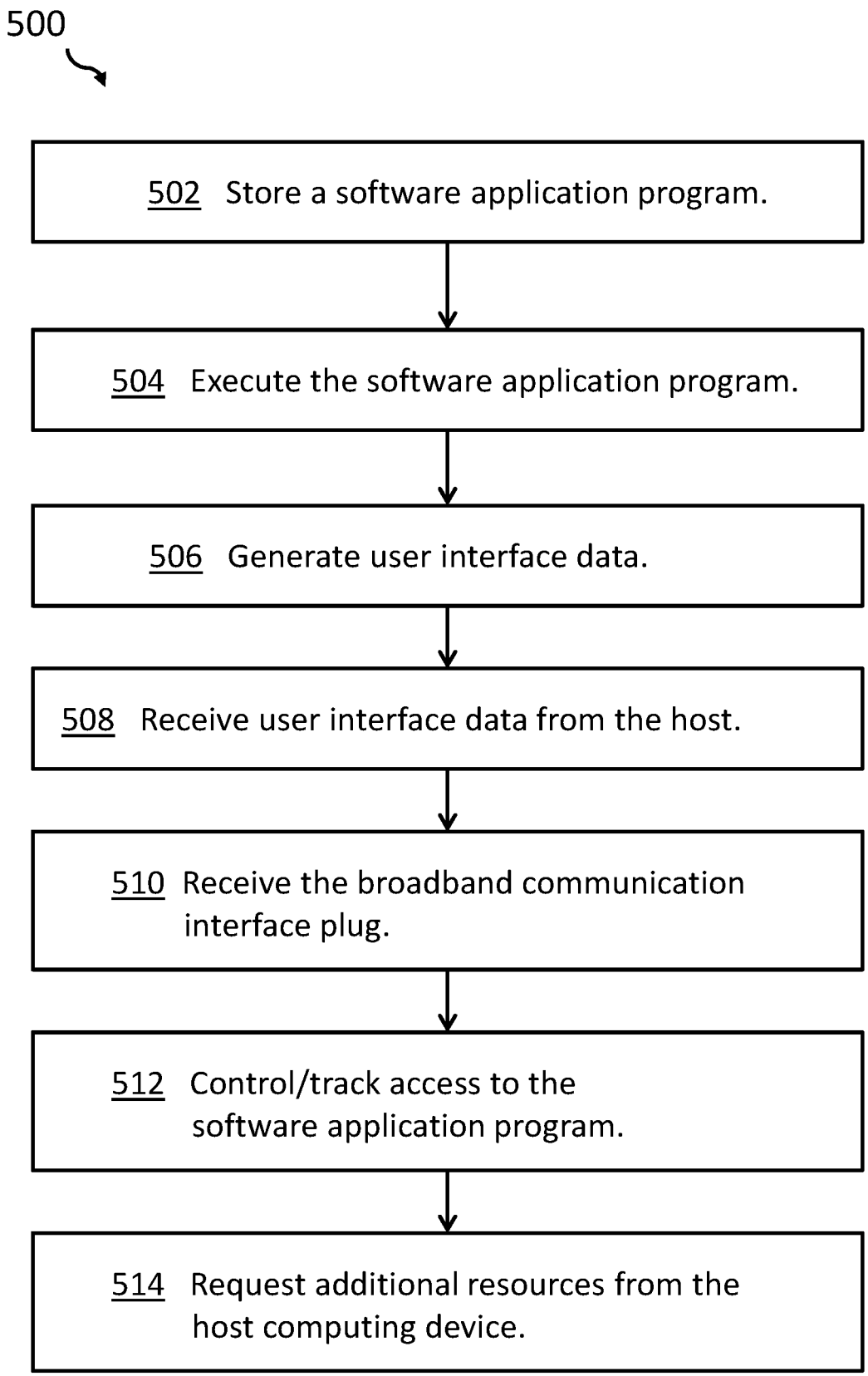

FIG. 5 depicts a flowchart of the method for operating the portable appliance, in accordance with an embodiment of the present invention.

Figure 6:
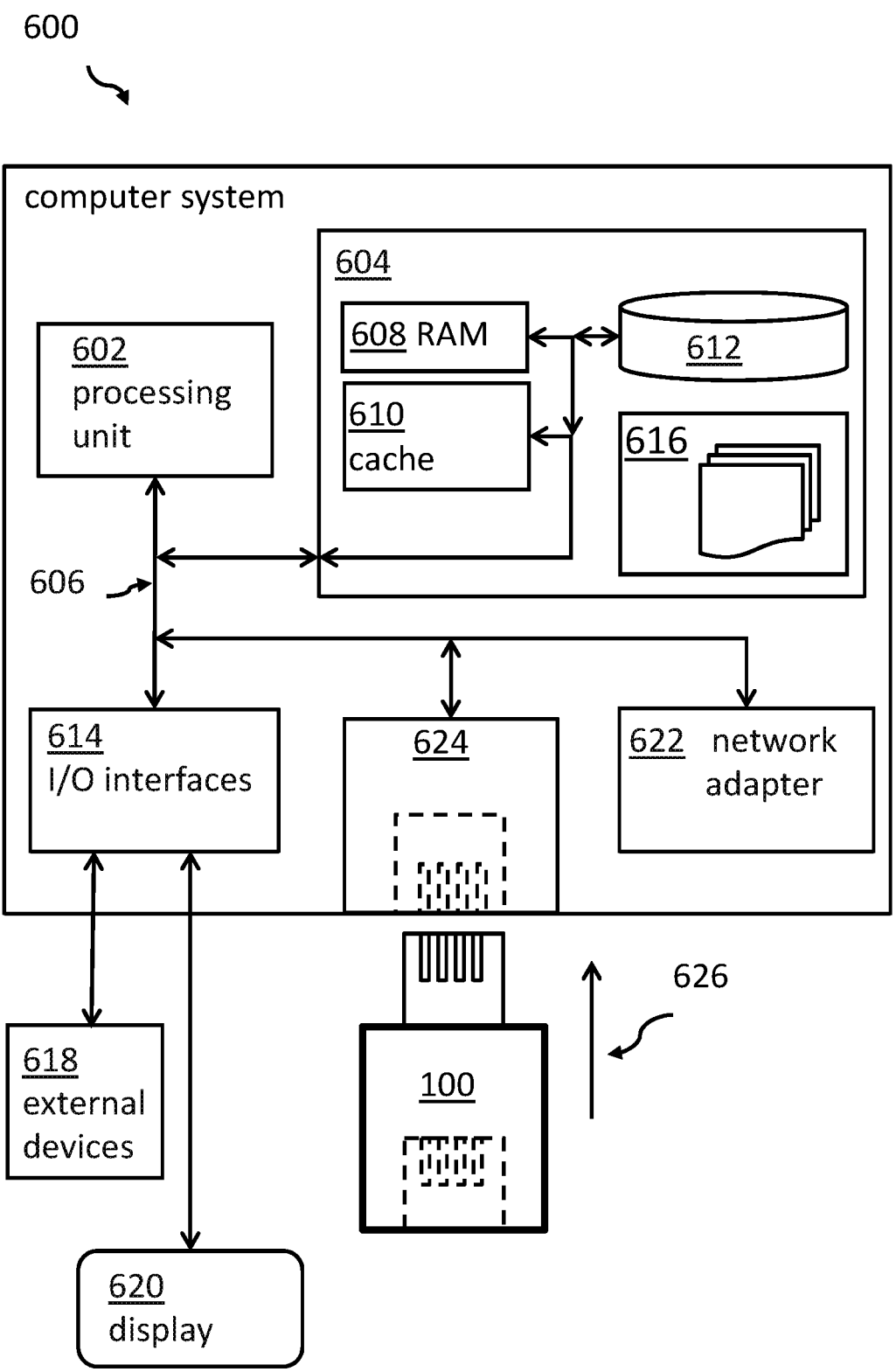

FIG. 6 depicts a computing system, with the inventive portable appliance, in accordance with an embodiment of the present invention.

DETAILED DESCRIPTION

In the context of this description, the following conventions, terms and/or expressions may be used to further illustrate and describe the invention.

The term 'appliance', in particular 'portable appliance', may denote a computer system with software and/or firmware that is specifically designed to provide a specific computing resource. Such devices became known as appliances because of the similarity in role or management to a home appliance, which are generally closed and sealed, and are not serviceable by the user or owner. The hardware and software are delivered as an integrated product and may even be pre-configured before delivered to a customer to provide a turn-key solution for a particular application. Unlike general purpose computers, appliances are generally not designed to allow the customers to change or reconfigure the hardware. The here described appliance is denoted portable. This may indicate that the appliance is particularly small, for example, smaller than a notebook computer, a tablet computer, and even a mobile phone. The portable appliance may be more in the dimensional range of a USB stick, a memory card, or a credit card. The portable appliance may have a size which may not allow integrating a decent user interface as part of the portable appliance.

The term 'storage device' may denote a long term, non-volatile storage for data and/or program data. The data is not lost if the power may be switched off. Thus, the storage may be a solid state disk, flash memory, a memristor array, or any other suitable memory that stores data in a powerless state.

The term 'processor' may denote a typical computer processor enabled to execute application software if loaded to the processor. The processor may have integrated random access memory (RAM), or may be connected to a memory array.

The term 'broadband communication interface plug' may denote any serial or parallel wire-bound communication link in the form of an electrical plug. The plug may be plugged into a corresponding socket such that electrical contact is established between the broadband communication interface plug and a corresponding socket. The underlying specification of the 'broadband communication interface' may be compliant to Universal Serial Bus (USB), FireWire, Thunderbolt, Peripheral Component Interconnect (PCI), or Peripheral Component Interconnect Express (PCI-E). Any other serial or parallel plug/socket combination may also be used. It may be noted that the specification of the plug and the corresponding socket may allow transmitting the data as well as electrical power. It may be noted that the communication interface may be bi-directional. The inventive concept may generally be implemented for any version of the broadband communication interface specifications.

Regarding the type and version of the plug/socket combination, any standard may be used. In the case of USB, all available and future device specifications may be supported, in particular USB Type-C, USB 2.0, USB 3.0, and related and derived standards, as well as proprietary plug/socket combination. Even completely proprietary plug/sockets with the named communication and power characteristics ("power and data") may be used.

The proposed portable appliance may offer multiple advantages and technical effects. The portable appliance may represent a complete computing system. The only missing component may be a user interface. The user may easily carry the portable appliance to any place in a very convenient way because the portable appliance may be smaller than a typical matchbox. Any host system may be used as an interaction system with the portable device as long as the host has a user interface. The portable devices may be stacked using their broadband communication plug and corresponding socket. This way, the available compute power may be multiplied according to the number of portable appliances stacked up. Additionally, the portable appliance may request resources from the host computer.

Furthermore, a license management system may be integrated. It may enable a confirmation that the software on the portable appliance may be used on a specific host system.

The processor of the portable appliance may be a special purpose processor which may be optimized for a specific technical field (e.g. cognitive computing or encryption) or it may be a general purpose processor operable for executing any software program equally good.

In the following paragraphs, additional embodiments of the inventive concept will be described.

According to one preferred embodiment, the portable appliance may also comprise a license management module for controlling and tracking access to the application software program. This way it may be controllable whether the portable alliance may work together with a specific host as user interface or for use of its wireless or wireline communication capabilities. It may also be controllable whether the portable appliance may be used in a special geographic area, for example, by using a GPS receiver and geographic coordinates allowing a usage of the portable appliance only in designated geographical areas, in which the license for the software stored in the portable appliance is licensed. The license management module may also work together with a corresponding module of the host such that only specific combinations of the portable appliance and host computing system may work together. The usage of the software may also only be licensed for a specific time period. Generally, all known licensing mechanisms may be used and implemented together with the inventive portable appliance.

According to one advantageous embodiment of the portable appliance, the broadband communication interface plug and/or the broadband communication socket may be adapted for providing a data link and electrical power connection. This way, the portable appliance may be supplied with electrical power, and at the same time a bidirectional communication link may be established.

According to one permissive embodiment of the portable appliance, the broadband communication interface plug and/or the broadband communication interface socket may be selected from a group comprising a USB, FireWire, Thunderbolt and a PCI/PCI-e. Other serial interfaces and protocols may also be possible as long as electrical power and a data link are provided. Alternatively, according to one embodiment, the portable appliance may be equipped with a rechargeable battery and solar cells for recharging the batteries. In this case, only a data link may be required as part of the plug and the socket.

According to one advantageous embodiment of the portable appliance, the application software program may comprise at least one of a database management system and analytics software. Thus, different portable appliances may serve specific purposes. One portable appliance may carry the software program, and the other portable appliance may also have data stored on it. The software may actually also be shared between different portable appliances that may be stacked. In case the analytics software may be a cognitive computing system, specific analytics portable appliances may be built. For example, a portable appliance for the health care industry, another portable appliance for the financial market, and another for the logistics industry, just to name a few. In a special embodiment, specific portable appliances for specific medical fields may be implemented by storing knowledge bodies for different medical fields on the storage of the portable appliance. By the license management, a tight control of user licenses may be implementable.

According to one preferred embodiment of the portable appliance, the broadband communication interface plug and/or the broadband communication interface socket may each be operable for transmitting resource requirements. This may include, but is not limited to, processor requirements, memory requirements, storage requirements, connectivity requirements, graphic card requirements or other user interface device requirements. Additionally, such requirements may also comprise any software specification. This way, the portable appliance may, although self-sufficient in terms of computing power and memory, request additional resources from the host for more complex tasks.

Special embodiments may support requests for a computing platform (e.g., an operating system environment like Windows /Linix, zOS, AIX, Android, iOS, IBM i/i5/OS/ OS/400, Java and many more), a Central Processing Unit (CPU) type, a hostname, a host identifier, a form-factor, a virtualization layer, a specific Internet Protocol (IP) address range, a username, time or time-zone data, a location (GPS based), external communication links (e.g. wireless, wireline, transmission speed, protocol used, etc.), and/or user interface device specifications (e.g. screen resolution, screen size, touch input, audio input/output, etc.).

According to one additionally advantageous embodiment of the portable appliance, the application software program data and/or the data may be encrypted making it impossible to change/manipulate the application software program and/or the data on the portable appliance from the outside. An access to the internal operations of the portable appliance may only be possible via an Application Programming Interface (API). This way, the internal structure, such as a stored application software program and/or data and configuration data, may not be altered directly but only via a dedicated interface which may define allowable alteration.

According to a further advantageous embodiment, the portable appliance may also comprise a second broadband communication interface socket, or even more. This way, a portable appliance connected to a host can accommodate additional portable appliances. They may be used for different purposes, for example, supplying different application software programs or additional data (e.g. encrypted by the processor of the related portable appliance). The portable appliance may also accommodate a specific database system or knowledge management system, potentially including special purpose data.

In the following, a detailed description of the Figures will be given. All instructions in the Figures are schematic. Firstly, a block diagram of the inventive portable appliance, in accordance with an embodiment of the present invention, is given. Afterwards, further embodiments, as well as embodiments of the method for operating a portable appliance, will be described.

FIG. 1 shows a block diagram of an embodiment of the portable appliance 100. The portable appliance 100 comprises at least one storage device 104, operable for storing at least one application software program 114. The storage device 100 is implemented as a non-volatile storage device for storing data and application software programs 114 also in case no electrical power is available for the portable appliance 100. In addition, the portable appliance 100 also comprises at least one processor 102 operable for executing the application software program 114. For this, a memory, in particular main memory, is coupled to the processor via a system bus (both not shown in FIG. 1). Basically, the components integrated into the portable appliance 100 may comprise all elements of a typical computer, including input/output management functions and circuits, an operating system, a power-on and power-down management unit, a memory management function, and so on. What is not available as part of the portable device 100 are input/output devices like a screen and typical input devices. However, a reset switch may be integrated into the portable appliance 100 in order to enable a safe restart of the portable appliance.

Furthermore, the portable appliance 100 comprises a broadband communication interface plug 106. The plug 106 may be equipped with electrical connections 108 operable to connect to electrical connections of a socket of a host device in order to (a) enable a supply of electrical power to the portable appliance 100, and (b) to provide a data communication link between the portable appliance 100 and a host device.

The broadband communication interface plug 106 may be implemented as any serial or parallel data communication interface, like USB, FireWire, Thunderbolt, PCI, PCI-E, and others, as long as a power and a data connection is available. The portable appliance 100 may be connected to a host computing system to have standard input/output devices available, in particular a screen, a keyboard, a pointing device, etc., to which functions of the portable appliance 100 may have access via a dedicated communication module. Examples of host devices to which the portable appliance 100 may be pluggable are any kind of computing devices, in particular PCs, tablet computers, smart phones but also host systems, which may be accessible via other end point computers or input/output devices connected via a network to the host system.

This way, a man/machine interface may be provided to the portable appliance 100. While all computing capabilities may be provided by the portable appliance 100, user interaction functions may be used from the host device.

Additionally, the portable appliance 100 also comprises a second broadband communication interface implemented in the form of a broadband communication interface socket 110. This broadband communication interface socket 110 can physically receive another broadband communication interface plug 106 of another portable appliance 100 of the same kind. Hence, the portable appliances 100 are stackable. Each of the portable appliances 100 is implemented as an individual microcomputer, however, without man/machine interface devices. The required user interface is "borrowed" from the host device.

The different portable appliances 100 may be equipped with different processors 102, potentially optimized for different tasks. For example, one processor 102 in one portable appliance 100 may be optimized to execute the application software program 114 (e.g. specific analytical software) while another processor 102 of another portable appliance 100, which may be connected via the broadband communication interface socket 110, may be optimized to execute an encryption/description application software program 114 to protect data stored in the storage device 104 of the second portable appliance 100. Different portable appliances 100 may also run different operating systems optimized for special tasks they are designed for.

It may also be possible that the portable appliance 100, via the processor 102 and associated communication components, requests additional resources from the host computer. Such resources may include processing power, memory, long-term storage, network capacity, specific resources of the user interface, in particular screen size, screen resolution, memory available in the graphics adapter, voice interfaces, and so on, in order to extend its own capabilities.

Furthermore, a license management module 112 may be implemented as part of the portable appliance 100. It may control access to the application software program 114, and potentially data also stored on the portable appliance 100 via a dedicated application programming interface. A key to unlock the functionality of the application software program 114 may be stored in the license management module 112. Additionally, it may also be possible that the portable appliances 100 may only be fully functionable as a pair of portable appliances 100 because the access key for either data or application software programs or both may be stored in a second portable appliance 100. Thus, two (and potentially more) portable appliances 100 control each other by storing the required access keys in the license management module 112 of the second portable appliance 100 of a pair of portable appliances. This may enable a very high level of data protection and prevent un-allowed access to, or usage of, application software programs because both portable appliances 100 have to be stacked on top of each other. Only together they may be fully functionable and accessible via a user interface device of a host computing device to which they may be plugged in stacked form.

FIG. 2 shows a block diagram 200 of an embodiment of two stacked portable appliances 100. Both portable appliances 100 may be identical, may only be different in the kind of application software program stored in the storage device 104. In other cases, the two portable appliances 100 may differ in the processor, the amount of main memory and/or other characteristics. In any case, the two portable appliances 100 may be stackable, as shown. The upper portable appliance 100 is plugged with its broadband communication interface plug 106 to the broadband communication interface socket 110 of the lower portable appliances 100. It may also be noted that portable appliances 100 may be equipped with controllers in order to communicate to each other via the broadband communication interface plug/socket combination. It may also be possible to connect the two portable appliances 100 via an extension cable.

FIG. 3 shows a block diagram 300 of an embodiment of a portable appliance 100*a* with two sockets 110*b*, 110*c*. Now, two additional portable appliances 100*b*, 100*c* may be plugged into the two broadband communication interface sockets 110*b*, 110*c* at the same time. This is indicated by the arrows 302*b*, 302*c*. It is not required that the broadband communication interface plug 106 and broadband communication interface socket 110 (100*b*, c respectively) are identical in their specifications. The broadband communication interface plug 106 may comply with a different plug/socket/protocol specification than the broadband communication interface socket 110 of the same portable appliance 100. However, in such a case, those portable appliances 100*b*, 100*c* need to be equipped with a corresponding broadband communication interface plug 106*b*, 106*c*.

It may be noted that details (e.g. processor, storage device) of the portable appliances 100*b*, 100*c* are not shown again in FIG. 3. However, a skilled person would also understand that these portable appliances 100*b*, 100*c* may have their broadband communication interface sockets 110*b*, 110*c*. A skilled person will also understand that more than two broadband communication interface sockets 110*b*, 110*c* may be implemented in a main portable appliance 100*a*. This way, computing power, as well as storage capacity of the stacked portable appliances 100*a*, may be multiplied. On the other side, as mentioned above, each (or a subset) of the portable appliances 100*a*, 100*b*, 100*c* may have specific characteristics in terms of operating platform, application software programs and/or data. Each of the portable appliances 100*a*, 100*b*, 100*c* may also be equipped with one or more Light Emitting Diodes (LEDs) in order to signal an operational status.

FIG. 4 shows an embodiment of a flow chart 400 of aspects of the method to operate the portable appliance. The process starts (step 402). The portable appliance is connected to a host computing device (step 404). Then, it may be checked (step 406) using the license management module of the portable appliance, whether the host may be licensed to work in cooperation with the portable appliance. In case of "Yes", it may be checked (step 408 Yes) whether additional resources of the host computing device are available/accessible. If that is the case, the portable device may obtain (step 410) the resources which may then be configured to the requirements of the portable appliance. In case of "No", the determination (step 408 No), whether resources are available, of an application of the portable appliance may be launched (step 412), and the user interface of the host computing device is used for interacting with the application software program of the portable appliance.

If the host is not licensed, in the case of "No", the determination "host licensed" (step 406), the process ends at step 414.

FIG. 5 shows an embodiment of a flowchart of the method 500 for operating the portable appliance. The portable appliance comprises, as already described above, a storage device, a processor, a broadband communication interface plug, and a broadband communication interface socket, besides having all components of a computing device without user interface devices. The method 500 comprises storing (step 502) at least one application software program on the storage device, executing (step 504) the application software program by the processor, and generating (step 506) user interface data by the processor displayable on a user interface of a house computing device.

The method 500 also comprises receiving (step 508) user interface response data by the processor via a broadband communication interface plug, and physically receive (step 510) the broadband communication interface plug of another portable appliance of the same kind in the broadband communication interface socket of the portable appliance.

Additionally, and optionally, the method comprises controlling (step 512) and tracking access to the application software program using a license management module as well as requesting (step 514) additional resources from the host computing device that the portable appliances are pluggable into.

Embodiments of the invention may be implemented together with virtually any type of computer as host computing device, regardless of the platform being suitable for storing and/or executing program code.

FIG. 6 shows, as an example, a computing system 600 suitable for executing program code related to the proposed method as well as serving as input/output device for the portable appliance 100. Although the broadband communication interface plug may often be shown as a kind of USB plug in the Figures, other plug/socket specifications are possible as part of the underlying inventive concept. The arrow 626 may indicate that the portable appliance 100 may be plugged in and to the corresponding socket 624 of the computing device 600. It may also be noted that the computing system 600 may be equipped with interface and/or communication software, and controllers, to communicate with their portable appliance 100 if this is plugged into the socket 624.

It may also be noted that most now-described characteristics of a computing system may also apply to the portable appliance, apart from dedicated external devices, like external storage or user interface devices, like screen or a keyboard.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components which are operational with numerous other general purpose, or special purpose, computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on, that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g. a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g. at least one) of program modules that are configured to carry out the functions of embodiments of the invention.

The program/utility, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g. the Internet) via network adapter 622. As depicted, network adapter 622 may communicate with the other components of computer system/server 600 via bus 606. It should be understood that although not shown, other hardware and/or software components could be used in conjunction with computer system/server 600. Examples include, but are not limited to, microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A portable appliance comprising:
   a storage device for storing at least one application software program;
   a processor for executing the at least one application software program;
   a broadband communication interface plug, pluggable to a computing device;
   a first broadband communication interface socket, wherein the first broadband communication interface socket is located on a side of the portable appliance, for connecting the broadband communication interface plug of a second portable appliance; and
   a second broadband communication interface socket, wherein the second broadband communication interface socket is located on the opposing side, of where the first broadband communication interface socket is located, of the portable appliance.

2. The portable appliance of claim 1, further comprising:
   a license management module for controlling and tracking access to the at least one application software program.

3. The portable appliance of claim 1, wherein the broadband communication interface plug, the first broadband communication interface socket, and the second broadband communication interface socket provides a data link and electrical power.

4. The portable appliance of claim 1, wherein the broadband communication interface plug, the first broadband communication interface socket, and the second broadband communication interface socket is selected from a group comprising a Universal Serial Bus (USB), a FireWire, a Thunderbolt, and a Peripheral Component Interconnect (PCI).

5. The portable appliance of claim 1, wherein the at least one application software program comprises at least one of a database management system or data analytics software.

6. The portable appliance of claim 1, wherein at least one of the broadband communication interface plug, the first broadband communication interface socket, and the second broadband communication interface socket requests one or more additional resources from one or more connected devices.

7. The portable appliance of claim 6, wherein the requested additional one or more resources from the one or more connected devices are selected from a group comprising a processing power, a memory, a long-term storage, a network capacity, a screen size, a screen resolution, a memory available in a graphics adapter, and a voice interface.

8. The portable appliance of claim 1, wherein data from the at least one application software program is encrypted.

9. The portable appliance of claim 1, wherein one or more functions of the portable appliance are accessible via an application programming interface.

10. A method for operating a portable appliance, the portable appliance comprising a storage, a processor, a broadband communication interface plug, a first broadband communication interface socket, and a second broadband communication interface socket,
    wherein the first broadband communication interface socket is located on a side of the portable appliance, for connecting the broadband communication interface plug of a second portable appliance; and wherein the second broadband communication interface socket is located on an opposing side of the portable appliance, of where the first broadband communication interface socket is located, the method comprising:
    storing at least one application software program on the storage of the portable appliance;
    requesting one or more additional resources from one or more connected devices;
    executing the at least one application software program, by the processor;
    generating user interface data, by the processor, wherein the user interface data is displayable on a user interface; and
    receiving user interface response data, by the processor, via the broadband communication interface plug of the portable appliance and the second portable appliance.

11. The method of claim 10, further comprising:
    controlling and tracking access to the at least one application software program using a license management module.

12. The method according to claim 10, wherein at least one of the broadband communication interface plug, the first broadband communication interface socket, and the second broadband communication interface socket provides a data link and electrical power.

13. The method of claim 10, wherein the broadband communication interface plug, the first broadband communication interface socket, and the second broadband communication interface socket is selected from a group comprising a Universal Serial Bus (USB), a FireWire, a Thunderbolt, and a Peripheral Component Interconnect (PCI).

14. The method of claim 10, wherein the at least one application software program comprises at least one of a database management system or data analytics software.

15. The method of claim 10, further comprising:
connecting a broadband communication interface plug of a second portable appliance with the first broadband communication interface socket of the portable appliance; and
connecting a broadband communication interface plug of a third portable appliance with the second broadband communication interface socket of the portable appliance.

16. The method of claim 10, wherein the additional resources from one or more connected devices are selected from a group comprising a processing power, a memory, a long-term storage, a network capacity, a screen size, a screen resolution, a memory available in a graphics adapter, and a voice interface.

17. The method of claim 10, wherein data from the at least one application software program is encrypted.

18. The method of claim 10, further comprising accessing one or more functions of the portable appliance and the second portable device via an application programming interface.

19. A computer program product for operating a portable appliance, the portable appliance comprising a storage, a processor, a broadband communication interface plug, a first broadband communication interface socket, and a second broadband communication interface socket,
wherein the first broadband communication interface socket is located on a side of the portable appliance, for connecting the broadband communication interface plug of a second portable appliance; and
wherein the second broadband communication interface socket is located on an opposing side of the portable appliance, of where the first broadband communication interface socket is located, the computer program product comprising a computer readable storage medium having program instructions embodied therewith, the program instructions being executable by one or more computing systems to cause the one or more computing systems to perform a method comprising:
storing at least one application software program on the storage of the portable appliance;
requesting one or more additional resources from one or more connected devices;
executing the application software program by the processor;
generating user interface data, by the processor, wherein the user interface data is displayable on a user interface; and
receiving user interface response data, by the processor, via the broadband communication interface plug of the portable appliance and the second portable appliance.

20. The program product of claim 19, further comprising:
connecting a broadband communication interface plug of a second portable appliance with the first broadband communication interface socket of the portable appliance; and
connecting a broadband communication interface plug of a third portable appliance with the second broadband communication interface socket of the portable appliance.

\* \* \* \* \*